No. 767,211.  
Patented August 9, 1904.

UNITED STATES PATENT OFFICE.

NANCY J. DOBBINS, OF LOS ANGELES, CALIFORNIA.

EGG-PRESERVING COMPOUND.

SPECIFICATION forming part of Letters Patent No. 767,211, dated August 9, 1904.

Application filed June 4, 1903. Serial No. 160,108. (No specimens.)

*To all whom it may concern:*

Be it known that I, NANCY J. DOBBINS, a citizen of the United States, residing at Los Angeles, in the county of Los Angeles and State of California, have invented a certain new and useful Composition of Matter to be Used for Preserving Eggs, of which the following is a specification.

My composition consists of the following ingredients combined in the proportions stated: water, one pint; sheet-gelatin, five ounces; white sugar, one table-spoonful; dissolved gum-tragacanth, one table-spoonful.

The ingredients forming the compound are commingled as follows: I place five ounces of sheet-gelatin in one pint of cold water and let it soak for one-half an hour, adding thereto one table-spoonful of white sugar. I also place, say, three pennyweights of gum-tragacanth in half a pint of cold water and permit it to soak and dissolve for twenty-four hours, after which I thoroughly mix the same until it is transparent and of the consistency of mucilage. I then add one table-spoonful of the dissolved gum-tragacanth to the gelatin solution and subject the mixture to heat, bringing it up to the boiling-point, after which I set the mixture aside to cool, and while cooling it congeals. When the mixture is to be used, it is again heated, but not as high as the boiling-point, and the egg dipped therein, remaining two or three seconds and then removed and laid away to dry.

The solution will hermetically seal the pores of the shell and thus materially lengthen the time during which the egg will remain edible, besides strengthening the shell against breakage.

I am aware that many processes and compounds have been invented for preserving eggs in which various preservatives are used— as lime, for instance; but I am not aware that all the ingredients of my composition have been used together.

It is evident that slight changes might be made in the proportions of the ingredients set forth without departing from the spirit and scope of my invention; but,

Having thus described my invention, what I claim as new, and desire to secure by Letters Patent, is—

The herein-described composition of matter for preserving eggs comprising five ounces of sheet-gelatin, soaked in one pint of cold water, one table-spoonful of sugar added thereto and one table-spoonful of dissolved gum-tragacanth.

In witness that I claim the foregoing I have hereunto subscribed my name this 27th day of May, 1903.

NANCY J. DOBBINS.

Witnesses:
 HENRY T. HAZARD,
 G. E. HARPHAM.